(12) United States Patent
Jones et al.

(10) Patent No.: US 6,397,458 B1
(45) Date of Patent: Jun. 4, 2002

(54) METHOD OF MAKING AN ELECTRET ARTICLE BY TRANSFERRING FLUORINE TO THE ARTICLE FROM A GASEOUS PHASE

(75) Inventors: Marvin E. Jones, Grant Township; Christopher S. Lyons; David B. Redmond, both of St. Paul; Jeffrey L. Solomon, Vadnais Heights; Seyed Abolhassan Angadjivand, Woodbury, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/478,658

(22) Filed: Jan. 6, 2000

Related U.S. Application Data

(62) Division of application No. 09/109,497, filed on Jul. 2, 1998.

(51) Int. Cl.$^7$ ................................................ H01R 43/00
(52) U.S. Cl. ........................... 29/825; 29/592.1; 29/826
(58) Field of Search ....................... 29/825, 826, 592.1, 29/830, 832, 833

(56) References Cited

U.S. PATENT DOCUMENTS

| | | |
|---|---|---|
| 3,994,258 A | 11/1976 | Simm |
| 4,043,331 A | 8/1977 | Martin et al. |
| 4,188,426 A | 2/1980 | Auerbach |
| 4,215,682 A | 8/1980 | Kubik et al. |
| 4,288,584 A | 9/1981 | Mishra |
| RE30,782 E | 10/1981 | van Turnhout |
| 4,407,852 A | 10/1983 | Sapieha et al. |
| 4,527,218 A | 7/1985 | von Seggern |
| 4,588,537 A | 5/1986 | Klaase et al. |
| RE32,171 E | 6/1986 | van Turnhout |
| 4,592,815 A | 6/1986 | Nakao |
| 4,652,282 A | 3/1987 | Ohmori et al. |
| 4,789,504 A | 12/1988 | Ohmori et al. |
| 4,798,850 A | 1/1989 | Brown |
| 4,874,399 A | 10/1989 | Reed et al. |
| 4,874,659 A | 10/1989 | Ando et al. |
| 5,025,052 A | 6/1991 | Crater et al. |
| 5,057,710 A | 10/1991 | Nishiura et al. |
| 5,099,026 A | 3/1992 | Crater et al |
| 5,110,620 A | 5/1992 | Tani et al. |
| 5,304,227 A | 4/1994 | Matsuura et al. |
| 5,370,830 A | 12/1994 | Jameson et al. |
| 5,411,576 A | 5/1995 | Jones et al. |
| 5,472,481 A | 12/1995 | Jones et al. |
| 5,496,507 A | 3/1996 | Angadjivand et al. |
| 5,554,722 A | 9/1996 | Eichenauer et al. |
| 5,558,809 A | 9/1996 | Groh et al. |
| 5,643,525 A | 7/1997 | McGinty et al. |
| 5,645,627 A | 7/1997 | Lifshutz et al. |
| 5,759,205 A | 6/1998 | Valentini |
| 5,908,598 A | 6/1999 | Rousseau et al. |
| 5,919,847 A | 7/1999 | Rousseau et al. |
| 5,935,303 A | 8/1999 | Kimura |
| 5,968,635 A | 10/1999 | Rousseau et al. |
| 5,976,208 A | 11/1999 | Rousseau et al. |
| 6,002,017 A | 12/1999 | Rousseau et al. |

FOREIGN PATENT DOCUMENTS

| | | |
|---|---|---|
| EP | 0 616 831 A1 | 8/1994 |
| EP | 0 615 007 A1 | 9/1994 |
| EP | 0 850 692 A1 | 7/1998 |
| GB | 2 060 259 A | 4/1981 |
| JP | 60-947 | 4/1980 |
| JP | 60-15137 | 4/1985 |
| JP | 1-232038 | 9/1988 |
| JP | 8-57225 | 3/1996 |
| WO | WO 96/26783 | 9/1996 |
| WO | WO 97/07272 | 2/1997 |
| WO | WO 98/58117 | 12/1998 |

OTHER PUBLICATIONS

Strobel, Mark, et al., *Plasma Fluorination of Polyolefins*, Journal of Polymer Science: Part A: Polymer Chemistry, vol. 25, 1295–1307 (1987).

Chudleigh, P.W., *Mechanism of Charge Transfer to a Polymer Surface By a Conducting Liquid Contact*, Journal of Applied Physics, vol. 47, No. 10, Oct. 1976.

Chudleigh, P. W., Charging of Polymer Foils Using Liquid Contacts, Appl. Phys. Lett. vol. 21, No. 11, Dec. 1, 1972.

Wente, *Superfine Thermoplastic Fibers*, Industrial and Engineering Chemistry, 48(8): 1342–1246 (1956).

Yatsuzuka, Kyoko, et al., *Electrification of Polymer Surface Caused by Sliding Ultrapure Water*, IEEE Transactions on Industry Applications, vol. 32, No. 4, Jul./Aug. 1996.

Derwent Publication of JP 08 057225 abstract (Mar. 5, 1996).

Derwent Publication of JP 05 253416 abstract (Oct. 5, 1993).

*Primary Examiner*—Carl J. Arbes
(74) *Attorney, Agent, or Firm*—Karl G. Hanson; Allison Johnson

(57) ABSTRACT

An electret is described that includes a surface modified polymeric article having surface fluorination produced by fluorinating the polymeric article.

58 Claims, 3 Drawing Sheets

METHOD OF MAKING AN ELECTRET ARTICLE BY TRANSFERRING FLUORINE TO THE ARTICLE FROM A GASEOUS PHASE

This is a divisional of application Ser. No. 09/109,497 filed Jul. 2, 1998.

This invention relates to preparing fluorinated electrets.

BACKGROUND

The filtration properties of nonwoven polymeric fibrous webs can be improved by transforming the web into an electret, i.e., a dielectric material exhibiting a quasi-permanent electrical charge. Electrets are effective in enhancing particle capture in aerosol filters. Electrets are useful in a variety of devices including, e.g., air filters, face masks, and respirators, and as electrostatic elements in electro-acoustic devices such as microphones, headphones, and electrostatic recorders.

Electrets are currently produced by a variety of methods including direct current ("DC") corona charging (see, e.g., U.S. Pat. No. 30,782 (van Turnhout)), and hydrocharging (see, e.g., U.S. Pat. No. 5,496,507 (Angadjivand et al.)), and can be improved by incorporating fluorochemicals into the melt used to produce the fibers of some electrets (see, e.g., U.S. Pat. No. 5,025,052 (Crater et al.)).

Many of the particles and contaminants with which electret filters come into contact interfere with the filtering capabilities of the webs. Liquid aerosols, for example, particularly oily aerosols, tend to cause electret filters to lose their electret enhanced filtering efficiency (see, e.g., U.S. Pat. No. 5,411,576 (Jones et al.)).

Numerous methods have been developed to compensate for loss of filtering efficiency. One method includes increasing the amount of the nonwoven polymeric web in the electret filter by adding layers of web or increasing the thickness of the electret filter. The additional web, however, increases the breathing resistance of the electret filter, adds weight and bulk to the electret filter, and increases the cost of the electret filter. Another method for improving an electret filter's resistance to oily aerosols includes forming the electret filter from resins that include melt processable fluorochemical additives such as fluorochemical oxazolidinones, fluorochemical piperazines, and perfluorinated alkanes. (See, e.g., U.S. Pat. No. 5,025,052 (Crater et al.)). The fluorochemicals should be melt processable, i.e., suffer substantially no degradation under the melt processing conditions used to form the microfibers that are used in the fibrous webs of some electrets. (See, e.g., WO 97/07272 (Minnesota Mining and Manufacturing)).

SUMMARY OF THE INVENTION

In one aspect, the invention features an electret that includes a surface modified polymeric article having surface fluorination produced by fluorinating a polymeric article. In one embodiment, the article includes at least about 45 atomic % fluorine as detected by ESCA. In another embodiment, the article includes a $CF_3$:$CF_2$ ratio of at least about 0.25 as determined according to the Method for Determining $CF_3$:$CF_2$. In other embodiments, the article includes a $CF_3$:$CF_2$ ratio of at least about 0.45 as determined according to the Method for Determining $CF_3$:$CF_2$.

In one embodiment, the article has a Quality Factor of at least about 0.25/$mmH_2O$, (preferably at least about 0.5/$mmH_2O$, more preferably at least about 1/$mmH_2O$).

In some embodiments, the article includes a nonwoven polymeric fibrous web. Examples of suitable fibers for the nonwoven polymeric fibrous web include polycarbonate, polyolefin, polyester, halogenated polyvinyl, polystyrene, and combinations thereof. Particularly useful fibers include polypropylene, poly-(4-methyl-1-pentene), and combinations thereof. In one embodiment, the article includes melt-blown microfibers.

In another aspect, the invention features an electret that includes a polymeric article having at least about 45 atomic % fluorine as detected by ESCA, and a $CF_3$:$CF_2$ ratio of at least about 0.45 as determined according to the Method for Determining $CF_3$:$CF_2$. In another embodiment, the electret includes at least about 50 atomic % fluorine as detected by ESCA, and a $CF_3$:$CF_2$ ratio of at least about 0.25 as determined according to the Method for Determining $CF_3$:$CF_2$.

In other aspects, the invention features a respirator that includes the above-described electrets. In still other aspects, the invention features a filter that includes the above-described electrets.

In one aspect, the invention features a method of making an electret that includes: (a) fluorinating a polymeric article to produce an article having surface fluorination; and (b) charging the fluorinated article in a manner sufficient to produce an electret. In one embodiment, the method includes charging the fluorinated article by contacting the fluorinated article with water in a manner sufficient to produce an electret, and drying the article. The method is useful for making the above-described electrets. In another embodiment, the method includes charging the fluorinated article by impinging jets of water or a stream of water droplets onto the fluorinated article at a pressure and for a period sufficient to produce an electret, and drying the article.

In other embodiments, the method includes fluorinating a polymeric article in the presence of an electrical discharge (e.g., an alternating current corona discharge at atmospheric pressure) to produce a fluorinated article. In one embodiment, the method includes fluorinating the polymeric article in an atmosphere that includes fluorine containing species selected from the group consisting of elemental fluorine, fluorocarbons, hydrofluorocarbons, fluorinated sulfur, fluorinated nitrogen and combinations thereof. Examples of suitable fluorine containing species include $C_5F_{12}$, $C_2F_6$, $CF_4$, hexafluoropropylene, $SF_6$, $NF_3$, and combinations thereof.

In other embodiments, the method includes fluorinating the polymeric article in an atmosphere that includes elemental fluorine.

In other embodiments, the method of making the electret includes: (A) fluorinating a nonwoven polymeric fibrous web (i) in an atmosphere that includes fluorine containing species and an inert gas, and (ii) in the presence of an electrical discharge to produce a web having surface fluorination; and (B) charging the fluorinated web in a manner sufficient to produce an electret.

In other aspects, the invention features a method of filtering that includes passing an aerosol through the above-described electrets to remove contaminants.

The fluorinated electrets of the invention exhibit a relatively high oily mist resistance relative to non-fluorinated electrets.

GLOSSARY

In reference to the invention, these terms having the meanings set forth below:

"electret" means a dielectric material exhibiting a quasi-permanent electrical charge. The term "quasi-permanent" means that the time constants characteristic for the decay of the charge are much longer than the time period over which the electret is used;

"surface modified" means that the chemical structure at the surface has been altered from its original state.

"surface fluorination" means the presence of fluorine atoms on a surface (e.g., the surface of an article);

"fluorine containing species" means molecules and moieties containing fluorine atoms including, e.g., fluorine atoms, elemental fluorine, and fluorine containing radicals;

"fluorinating" means placing fluorine atoms on the surface of an article by transferring fluorine containing species from a gaseous phase to the article by chemical reaction, sorption, condensation, or other suitable means;

"aerosol" means a gas that contains suspended particles in solid or liquid form; and "contaminants" means particles and/or other substances that generally may not be considered to be particles (e.g., organic vapors).

DESCRIPTION OF PREFERRED EMBODIMENTS

Figure 1:
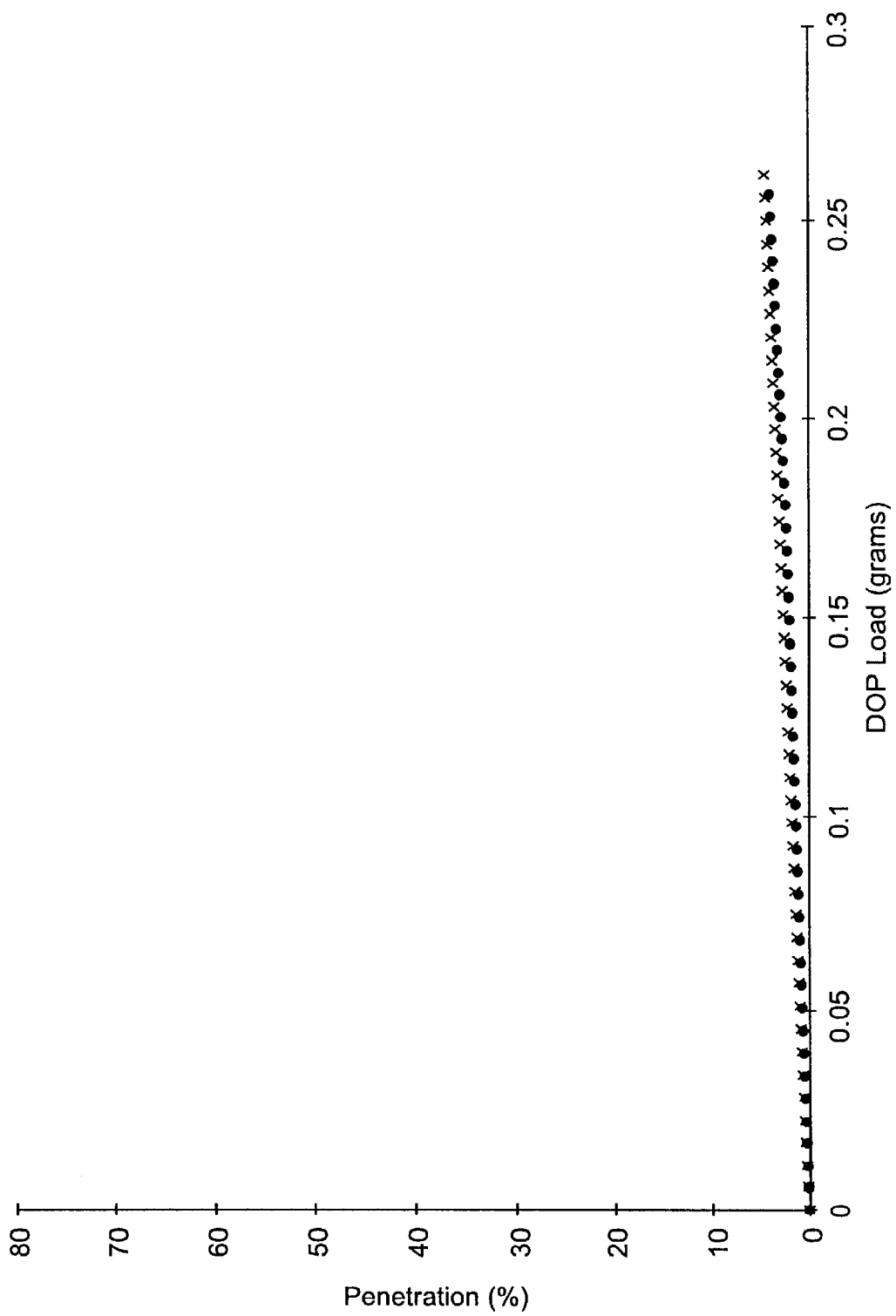
FIG. 1 is a plot of % DOP Penetration vs. DOP Load for Examples 36 and 37.

The electret includes a surface modified polymeric article (e.g., a nonwoven polymeric fibrous web) produced by fluorinating a polymeric article. The electrets preferably have sufficient surface fluorination to provide oily mist resistance. One measure of oily mist resistance is how well the electret maintains its Quality Factor during challenge with an aerosol. The Quality Factor can be calculated from results obtained from the dioctylphthalate ("DOP") initial penetration test ("the DOP test"). The DOP test also provides a relative measure of the charge state of the filter. The DOP test procedure involves forcing DOP aerosol at a face velocity of 6.9 cm/second for a period of about 30 seconds through the sample, measuring the pressure drop across the sample (Pressure Drop measured in $mmH_2O$) with a differential manometer, and measuring the percent DOP penetration (DOPPen %). The Quality Factor (QF) (measured in $1/mmH_2O$) can be calculated from these values according to the following formula:

$$QF[1/mmH_2O] = \frac{-Ln\frac{DOPPenetration(\%)}{100}}{PressureDrop[mmH_2O]}$$

The higher the Quality Factor at a given flow rate, the better the filtering performance of the electret.

Preferred electrets have a Quality Factor of at least about $0.25/mmH_2O$, preferably at least about 0.5/mmH20, more preferably at least about $1.0/mmH_2O$.

Electron spectroscopy for chemical analysis ("ESCA") (also known as X-ray photoelectron spectroscopy ("XPS")) provides one measure of surface fluorination. Preferably the surface of the electret exhibits at least about 45 atomic % fluorine, more preferably at least about 50 atomic % fluorine when analyzed by ESCA. ESCA analyzes the elemental composition of the outermost surface (i.e., approximately 10 to 50 Å) of a specimen. ESCA can be used to detect all elements in the periodic table except helium and hydrogen.

The electret also has a $CF_3:CF_2$ ratio at the surface of the electret of at least about 0.25, preferably at least about 0.45, and more preferably greater than 0.9, as determined according to the Method For Determining $CF_3:CF_2$ ratio set forth in the Example section below.

In one embodiment, the electrets include nonwoven polymeric fibrous webs that include fibers such as, e.g., meltblown microfibers, staple fibers, fibrillated films, and combinations thereof. The fibers can be formed from resins. Preferably the resin is a thermoplastic nonconductive, i.e., having a resistivity of greater than $10^{14}$ ohm-cm, resin. The resin used to form the fibers should be substantially free of materials such as antistatic agents that could increase the electrical conductivity or otherwise interfere with the ability of the fibers to accept and hold electrostatic charges.

Examples of useful thermoplastic resins include polyolefins such as, e.g., polypropylene, polyethylene, poly-(4-methyl-1-pentene), and combinations thereof, halogenated vinyl polymers (e.g., polyvinyl chloride), polystyrene, polycarbonates, polyesters, and combinations thereof.

Additives can be blended with the resin including, e.g., pigment, UV stabilizers, antioxidants, and combinations thereof.

Meltblown microfibers can be prepared as described in Wente, Van A., "Superfine Thermoplastic Fibers,"*Industrial Eng. Chemistry*, Vol. 48, pp. 1342–1346 and in Report No. 4364 of the Naval Research laboratories, published May 25, 1954, entitled, "Manufacture of Super Fine Organic Fibers," by Wente et al. Meltblown microfibers preferably have an effective fiber diameter in the range of less than 1 to 50 µm as calculated according to the method set forth in Davies, C. N., "The Separation of Airborne Dust and Particles," Institution of Mechanical Engineers, London, Proceedings 1B, 1952.

The presence of staple fibers provides a more lofty, less dense web than a web constructed solely of meltblown microfibers. Preferably the electret contains more than 70% by weight staple fibers. Webs containing staple fibers are disclosed in U.S. Pat. No. 4,118,531 (Hauser).

Electrets that include a nonwoven polymeric fibrous web preferably have a basis weight in the range of about 10 to 500 $gm^2$, more preferably about 10 to 100 $gm^2$. The thickness of the nonwoven polymeric fibrous web is preferably about 0.25 to 20 mm, more preferably about 0.5 to 2 mm.

The nonwoven polymeric webs of the electret can also include particulate matter as disclosed, for example, in U.S. Pat. No. 3,971,373, (Braun), U.S. Pat. No. 4,100,324 (Anderson), and U.S. Pat. No. 4,429,001 (Kolpin et al.).

Electret Preparation

The electrets can be prepared by fluorinating a polymeric article, optionally in the presence of a surface modifying electrical discharge, and charging the fluorinated article to produce an electret.

The fluorination process includes modifying the surface of the polymeric article to contain fluorine atoms by exposing the polymeric article to an atmosphere that includes fluorine containing species. The fluorination process can be performed at atmospheric pressure or under reduced pressure. The fluorination process is preferably performed in a controlled atmosphere to prevent contaminants from interfering with the addition of fluorine atoms to the surface of the article. The atmosphere should be substantially free of oxygen and other contaminants. Preferably the atmosphere contains less than 0.1% oxygen.

The fluorine containing species present in the atmosphere can be derived from fluorinated compounds that are gases at room temperature, become gases when heated, or are capable of being vaporized. Examples of useful sources of fluorine containing species include, fluorine atoms, elemental fluorine, fluorocarbons (e.g., $C_5F_{12}$, $C_2F_6$, $CF_4$, and hexafluoropropylene), hydrofluorocarbons (e.g., $CF_3H$), fluorinated sulfur (e.g., $SF_6$), fluorinated nitrogen (e.g., $NF_3$), fluorochemicals such as e.g., $CF_3OCF_3$ and fluorochemicals available under the trade designation Fluorinert such as, e.g., Fluorinert FC-43 (commercially available from Minnesota Mining and Manufacturing Company, Minnesota), and combinations thereof.

The atmosphere of fluorine containing species can also include an inert diluent gas such as, e.g., helium, argon, nitrogen, and combinations thereof.

The electrical discharge applied during the fluorination process is capable of modifying the surface chemistry of the polymeric article when applied in the presence of a source of fluorine containing species. The electrical discharge is in the form of plasma, e.g., glow discharge plasma, corona plasma, silent discharge plasma (also referred to as dielectric barrier discharge plasma and alternating current ("AC") corona discharge), and hybrid plasma, e.g., glow discharge plasma at atmospheric pressure, and pseudo glow discharge. Preferably the plasma is an AC corona discharge plasma at atmospheric pressure. Examples of useful surface modifying electrical discharge processes are described in U.S. Pat. Nos. 5,244,780, 4,828,871, and 4,844,979.

Another fluorination process includes immersing a polymeric article into a liquid that is inert with respect to elemental fluorine, and bubbling elemental fluorine gas through the liquid to produce a surface fluorinated article. Examples of useful liquids that are inert with respect to fluorine include perhalogenated liquids, e.g., perfluorinated liquids such as Performance Fluid PF 5052 (commercially available from Minnesota Mining and Manufacturing Company). The elemental fluorine containing gas that is bubbled through the liquid can include an inert gas such as, e.g., nitrogen, argon, helium, and combinations thereof.

Charging the polymeric article to produce an electret can be accomplished using a variety of techniques, including, e.g., hydrocharging, i.e., contacting an article with water in a manner sufficient to impart a charge to the article, followed by drying the article, and DC corona charging. The charging process can be applied to one or more surfaces of the article.

One example of a useful hydrocharging process includes impinging jets of water or a stream of water droplets onto the article at a pressure and for a period sufficient to impart a filtration enhancing electret charge to the web, and then drying the article. The pressure necessary to optimize the filtration enhancing electret charge imparted to the article will vary depending on the type of sprayer used, the type of polymer from which the article is formed, the type and concentration of additives to the polymer, and the thickness and density of the article. Pressures in the range of about 10 to about 500 psi (69 to 3450 kPa) are suitable. An example of a suitable method of hydrocharging is described in U.S. Pat. No. 5,496,507 (Angadjivand et al.).

The jets of water or stream of water droplets can be provided by any suitable spray device. One example of a useful spray device is the apparatus used for hydraulically entangling fibers.

Examples of suitable DC corona discharge processes are described in U.S. Pat. No. 30,782 (van Turnhout), U.S. Pat. No. 31,285 (van Turnhout), U.S. Pat. No. 32,171 (van Turnhout), U.S. Pat. No. 4,375,718 (Wadsworth et al.), U.S. Pat. No. 5,401,446 (Wadsworth et al.), U.S. Pat. No. 4,588,537 (Klasse et al.), and U.S. Pat. No. 4,592,815 (Nakao).

The fluorinated electrets formed by the methods described herein are suitable for use as, e.g., electrostatic elements in electro-acoustic devices such as microphones, headphones and speakers, fluid filters, dust particle control devices in, e.g., high voltage electrostatic generators, electrostatic recorders, respirators (e.g., prefilters, canisters and replaceable cartridges), heating, ventilation, air conditioning, and face masks.

The invention will now be described further by way of the following examples.

EXAMPLES

Test Procedures

Test procedures used in the examples include the following.

Method for Determining $CF_3$:$CF_2$

ESCA data was collected on a PHI 5100 ESCA system (Physical Electronics, Eden Prairie, Minn.) using a non-monochromatic MgKα x-ray source and a 45 degree electron takeoff angle with respect to the surface. The carbon (1s) spectra were peak fit using a nonlinear least-squares routine supplied by PHI (Physical Electronics, Eden Prairie, Minn.). This routine used a linear background subtraction, and a gaussian peak save for the component peaks. The spectra were referenced to the hydrocarbon peak at 285.0 eV. The $CF_3$ and $CF_2$ components were identified as the peaks located at about 294 eV and 292 eV respectively (according to the procedure described in Strobel et al., J. Polymer Sci. A: Polymer Chemistry, Vol. 25, pp. 1295–1307 (1987)). The $CF_3$:$CF_2$ ratio represent the ratio of the peak areas of the $CF_3$ and $CF_2$ components.

Initial Dioctylphthalate Penetration (DOP) and Pressure Drop Test Procedure

Initial DOP penetration is determined by forcing 0.3 micrometer diameter dioctyl phthalate (DOP) particles at a concentration of between 70 and 140 mg/m$^3$ (generated using a TSI No. 212 sprayer with four orifices and 30 psi clean air) through a sample of filter media which is 4.5 inches in diameter at a rate of 42.5 L/min (a face velocity of 6.9 centimeters per second). The sample is exposed to the DOP aerosol for 30 seconds until the readings stabilize. The penetration is measured with an optical scattering chamber, Percent Penetration Meter Model TPA-8F available from Air Techniques Inc.

Pressure drop across the sample is measured at a flow rate of 42.5 L/min (a face velocity of 6.9 cm/sec) using an electronic manometer. Pressure drop is reported in mm of water ("mm $H_2O$").

DOP penetration and pressure drop are used to calculate the quality factor "QF" from the natural log (ln) of the DOP penetration by the following formula:

$$QF[1/mmH_2O] = \frac{-Ln\frac{DOPPenetration(\%)}{100}}{PressureDrop[mmH_2O]}$$

A higher initial QF indicates better initial filtration performance. A decreased QF effectively correlates with decreased filtration performance.

DOP Loading Test

DOP loading is determined using the same test equipment used in the DOP penetration and pressure drop tests. The test sample is weighed and then exposed to the DOP aerosol for at least 45 min to provide a minimum exposure of at least about 130 mg. DOP penetration and pressure drop are measured throughout the test at least as frequently as once per minute. The mass of DOP collected is calculated for each measurement interval from the measured penetration, mass of the filter web, and total mass of DOP collected on the filter web during exposure ("DOP Load").

Corona Fluorination

Example 1

A blown polypropylene microfiber web prepared from Exxon 3505G polypropylene resin (Exxon Corp.) and having an effective fiber diameter of 7.5 µm and a basis weight of 62 g/m$^2$ was prepared as described in Wente, Van A., "Superfine Thermoplastic Fibers,"*Industrial Eng. Chemistry*, Vol. 48, pp. 1342–1346.

The blown microfiber web was then AC corona fluorinated in a 1% by volume $C_2F_6$ in helium atmosphere at a corona energy of 34 J/cm$^2$, which corresponded to a corona power of 2000 W at a substrate speed of 1 m/min. The AC corona fluorination treatment was performed in an AC corona system that included the so-called "double-dielectric" electrode configuration with a ground roll consisting of 40 cm diameter nickel-plated aluminum roll covered with 1.5 mm of poly(ethylene terephthalate) and maintained at a temperature of 23° C. using recirculating, pressurized water. The powered electrodes consisted of 15 individual ceramic-covered electrodes (available from Sherman treaters Ltd., Thame, United Kingdom) each with a 15 mm square cross-section and an active length of 35 cm. The electrodes were connected to a model RS48-B (4 kW) variable-frequency power supply (available from ENI Power Systems Inc., Rochester, N.Y.). The net power dissipated in the AC corona was measured with a directional power meter incorporated into the ENI supply. The frequency of the output power was manually adjusted to about 16 kHz to obtain optimal impedance matching (minimum reflected power).

The AC corona system was enclosed within a controlled environment. Prior to treatment, the atmosphere surrounding the AC corona treatment system was purged with helium, and then continually flushed with 100 liters/min of 1% by volume $C_2F_6$ in helium, which was introduced near the electrodes.

The microfiber web was taped onto a carrier film of 0.05 mm thick bi-axially-oriented polypropylene (BOPP), and then placed on the ground roll such that the carrier film was in contact with the ground roll, causing one side of the blown microfiber web to be exposed to the discharge. After treatment, the blown microfiber web was flipped over, retaped to the carrier film, and AC corona treated a second time under the same conditions as the first treatment to expose the other side of the blown microfiber web to the discharge.

Example 2

A G100 Filtrete fibrillated film web (available from Minnesota Mining and Manufacturing), having a basis weight of 100 g/m$^2$, was corona fluorinated following the method described in Example 1, with the exception that the ground roll was maintained at a temperature of 25° C.

Example 3

A polyethylene meltblown microfiber web, prepared from Aspun PE-6806 polyethylene resin (DOW Chemical Company, Michigan) and having a basis weight of 107 g/m$^2$, was corona fluorinated following the method described in Example 2.

Example 4

A polyester staple fiber web (available from Rogers Corporation), having a basis weight of 200 g/m$^2$, was corona fluorinated following the method described in Example 2.

Example 5

A poly-4-methyl-1-pentene meltblown microfiber web prepared from TPX MX-007 poly-4-methyl-1-pentene resin (Mitsui), and having a basis weight of 50 g/m$^2$ and an effective fiber diameter of 8.1 µm, was corona fluorinated following the method described in Example 2.

Examples 6–9

Examples 6–9 were prepared following the procedure in Example 1 except that the source of fluorine containing species was as follows: 1% $CF_4$ (Example 6), and 0.1% hexafluoropropylene (Example 7), 0.1% $C_5F_{12}$ (Example 8), and 1.0% $C_5F_{12}$ (Example 9).

The surface chemistry of each of the sample webs of Examples 1–9 was determined by ESCA analysis using a PHI 5100 ESCA system. The $CF_3$:$CF_2$ ratio was determined for each of the samples of Examples 1–9 from the ESCA data according to the above-described method. The results are reported in atomic % in Table I.

TABLE I

| Example | Carbon | Nitrogen | Oxygen | Fluorine | $CF_3$:$CF_2$ |
| --- | --- | --- | --- | --- | --- |
| 1 | 43 |  | 5.7 | 51 | 1.09 |
| 2 | 44 |  | 6.2 | 50 | 1.37 |
| 3 | 49 | 0.2 | 8.2 | 42 | 1.10 |
| 4 | 42 | 0.5 | 7.8 | 49 | 0.99 |
| 5 | 44 | 0.0 | 2.9 | 53 | 1.19 |
| 6 | 41 |  | 3.5 | 55 | 0.86 |
| 7 | 41 |  | 2.7 | 56 | 0.97 |
| 8 | 42 |  | 6.4 | 52 | 0.91 |
| 9 | 43 |  | 5.2 | 51 | 0.89 |

Hydrocharging

Example 10

A fluorinated polypropylene blown microfiber web prepared as described above in Example 1, was passed over a vacuum slot at a rate of 5 cm/sec centimeters/second) while deionized water was sprayed onto the web at a hydrostatic pressure of about 90 psi from a pair of Spraying Systems Teejet 9501 sprayer nozzles mounted 10 cm apart and centered 7 cm above the vacuum slot. The sample was then inverted and passed through the deionized water spray a second time such that both sides of the web were sprayed with water. The deionized water spray was then removed and the web was again passed over the vacuum slot to remove excess water. The web was then hung to dry at ambient conditions.

Example 11

A fluorinated poly-4-methyl1-pentene meltblown microfiber web prepared according to Example 5 was charged following the procedure of Example 10.

Examples 10A–11A

Examples 10A–11A were prepared following the procedures of Example 10 and 11 respectively, with the exception that, after corona fluorination and prior to hydrocharging, each of the fluorinated webs of Examples 10A–11A were subjected to an anneal at 140° C. (300° F.) for about 10 minutes.

Examples 13, 15, 16, 18 and 20

Examples 13, 15, 16, 18 and 20 were charged following the procedure of Example 10, with the exception that the fluorinated polymeric fibrous webs used in each of Examples 13, 15, 16, 18 and 20 were as follows: a fluorinated polyethylene microfiber web prepared according to Example 3 above (Example 13); a fluorinated polyester staple fiber web prepared according to Example 4 (Example 15); a fluorinated G100 Filtrete fibrillated film web prepared according to Example 2 (Example 16); a fluorinated polypropylene needle punched web (12 denier/fiber fibers of Exxon 3505 polypropylene resin), having a basis weight of about:200 gm$^2$, and having been corona fluorinated following the method described in Example 1 (Example 18); and a polypropylene melt blown fine fiber web, having a basis weight of 46 gm$^2$ and an effective fiber diameter of 3.7 μm, and having been corona fluorinated following the method described in Example 1 with the exception that 0.2% $C_5F_{12}$ was used instead of 1% $C_2F_6$ (Example 20).

DC Corona Charging

Example 12

The fluorinated polyethylene meltblown microfiber web of Example 3 was charged using a DC corona discharge as follows. The fluorinated web was placed in contact with an aluminum ground plane, and then passed under an electrically positive DC corona source, in air, at a rate of about 1.2 meters/min, while maintaining a current to ground plane of about 0.01 mA/cm of corona source length. The distance from corona source to ground was about 4 cm.

Examples 14, 17, 19

Examples 14, 17 and 19 were charged following the procedure of Example 12, with the exception that the fluorinated polymeric fibrous webs for each of Examples 14, 17 and 19 were as follows: a fluorinated polyester staple fiber web prepared following the procedure of Example 4 (Example 14); a fluorinated polypropylene needle punched web (12 denier/fiber fibers made from Exxon 3505 polypropylene resin), having a basis weight of about 200 gm$^2$, and having been corona fluorinated following the method described in Example 1 (Example 17); and a fluorinated polypropylene meltblown fine fiber web, having a basis weight of 46 g/m$^2$ and an effective fiber diameter of 3.7 μm, and having been corona fluorinated following the method described in Example 1 with the exception that 0.2% $C_5F_{12}$ was used instead of 1% $C_2F_6$ (Example 19).

Example 21–35

Examples 21–35 were prepared by fluorinating polypropylene blown microfiber webs following the procedure of Example 1, with the exception that the source of fluorine for each of Examples 21–35 was as follows: 1% $CF_4$ (Examples 21–23), 1% $C_2F_6$ (Examples 24–26), 0.1% hexafluoropropylene (Examples 27–29), 0.1% $C_5F_{12}$ (Examples 30–32), and 1.0% $C_5F_{12}$ (Examples 33–35).

The fluorinated webs of Examples 23, 26, 29, 32, and 35 were then charged following the hydrocharging process described above in Example 10.

The fluorinated webs of Examples 22, 25, 28, 31 and 34 were then charged following the DC corona charging process described above in Example 12.

% DOP penetration ("%DOP PEN"), Pressure Drop (mmH$_2$O), and the Quality Factor ("QF") for each of the electrets of Examples 10–35 were determined according to the above-described Initial DOP Penetration and Pressure Drop Test Procedure. The results are summarized in Table II.

TABLE II

| EXAMPLE | % DOP PEN | PRESSURE DROP | QF |
|---|---|---|---|
| 10 | 0.119 | 3.65 | 1.84 |
| 10A | 0.140 | 3.21 | 2.05 |
| 11 | 2.45 | 1.46 | 2.54 |
| 11A | 0.778 | 1.60 | 3.04 |
| 12 | 56.1 | 1.14 | 0.51 |
| 13 | 38.1 | 1.15 | 0.84 |
| 14 | 78.3 | 0.38 | 0.64 |
| 15 | 65.6 | 0.41 | 1.03 |
| 16 | 27.3 | 0.40 | 3.25 |
| 17 | 70.4 | 0.19 | 1.85 |
| 18 | 37.6 | 0.19 | 5.15 |
| 19 | 0.81 | 10.58 | 0.46 |
| 20 | 0.006 | 11.3 | 0.86 |
| 21 | 55.6 | 2.83 | 0.21 |
| 22 | 15.0 | 3.28 | 0.58 |
| 23 | 0.288 | 3.09 | 1.89 |
| 24 | 54.1 | 3.05 | 0.20 |
| 25 | 14.3 | 3.32 | 0.59 |
| 26 | 0.243 | 3.08 | 1.95 |
| 27 | 59.0 | 2.81 | 0.19 |
| 28 | 16.2 | 2.80 | 0.65 |
| 29 | 0.276 | 2.90 | 2.03 |
| 30 | 52.5 | 3.15 | 0.20 |
| 31 | 14.0 | 3.11 | 0.63 |
| 32 | 0.250 | 2.99 | 2.00 |
| 33 | 45.3 | 3.10 | 0.26 |
| 34 | 14.9 | 2.93 | 0.65 |
| 35 | 0.244 | 3.14 | 1.92 |

Examples 36–39

Four fluorinated, polypropylene microfiber webs were prepared according to Example 1 with the exception that the source of fluorine containing species was as follows: 0.1% hexafluoropropylene ("HFP") (Examples 36 and 38) and 0.1% $C_5F_{12}$ (Example 37 and 39).

Examples 36 and 37 further included charging the fluorinated polypropylene webs following the hydrocharging charging procedure of Example 10.

Examples 38 and 39 further included charging the fluorinated polypropylene webs following the DC corona charging procedure of Example 12.

Figure 2:
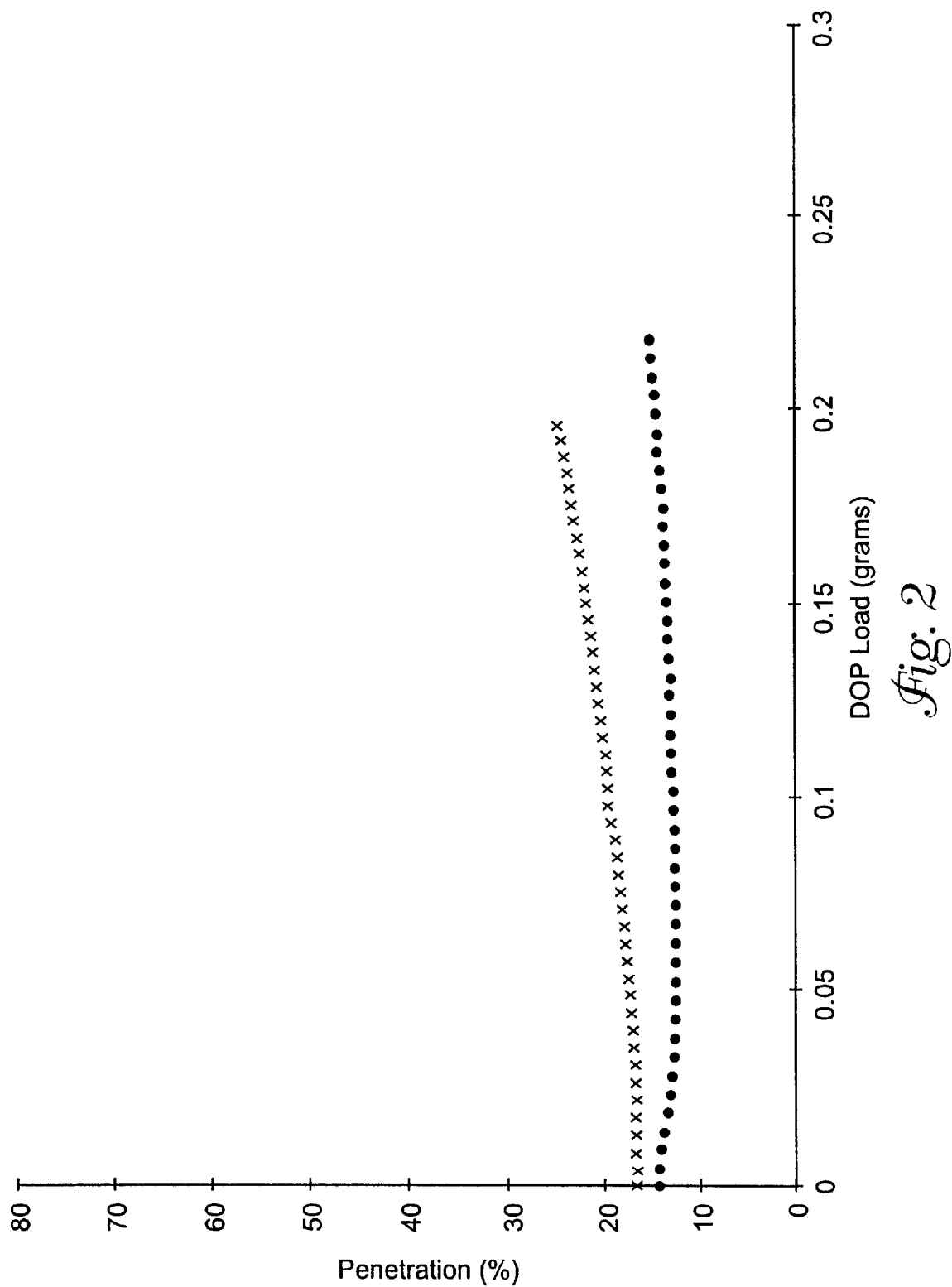
FIG. 2 is a plot of % DOP Penetration vs. DOP Load for Examples 38 and 39.

Examples 36–39 were subjected to the above-described DOP Loading Test. The % DOP Penetration versus DOP loading (the amount of DOP collected on the web in grams) for each of Examples 36–39 was measured according to the above-described DOP Loading Test Procedure. The resulting data are plotted as % DOP penetration versus DOP load (grams) in FIGS. 1 and 2 as follows: Examples 36 and 37 (indicated with x's and solid circles respectively) (FIG. 1), and Examples 38 and 39 (indicated with x's and solid circles respectively) (FIG. 2).

Example 40

A 7 in. sample of polypropylene microfiber web having a basis weight 61 g/m$^2$ was placed under a nitrogen atmosphere. A gaseous mixture of 5% by volume elemental fluorine diluted in nitrogen was passed through the polypropylene microfiber web at a rate of 1.0 l/min for 10 minutes. The fluorine concentration was then increased to 10% by volume diluted in nitrogen and passed through the web at a rate of 1.0 l/min for an additional 20 minutes.

The sample was then analyzed by ESCA and determined to have 62 atomic % fluorine and a $CF_3:CF_2$ ratio of 0.59, as determined according to the above-described Method for Determining $CF_3:CF_2$.

Figure 3:
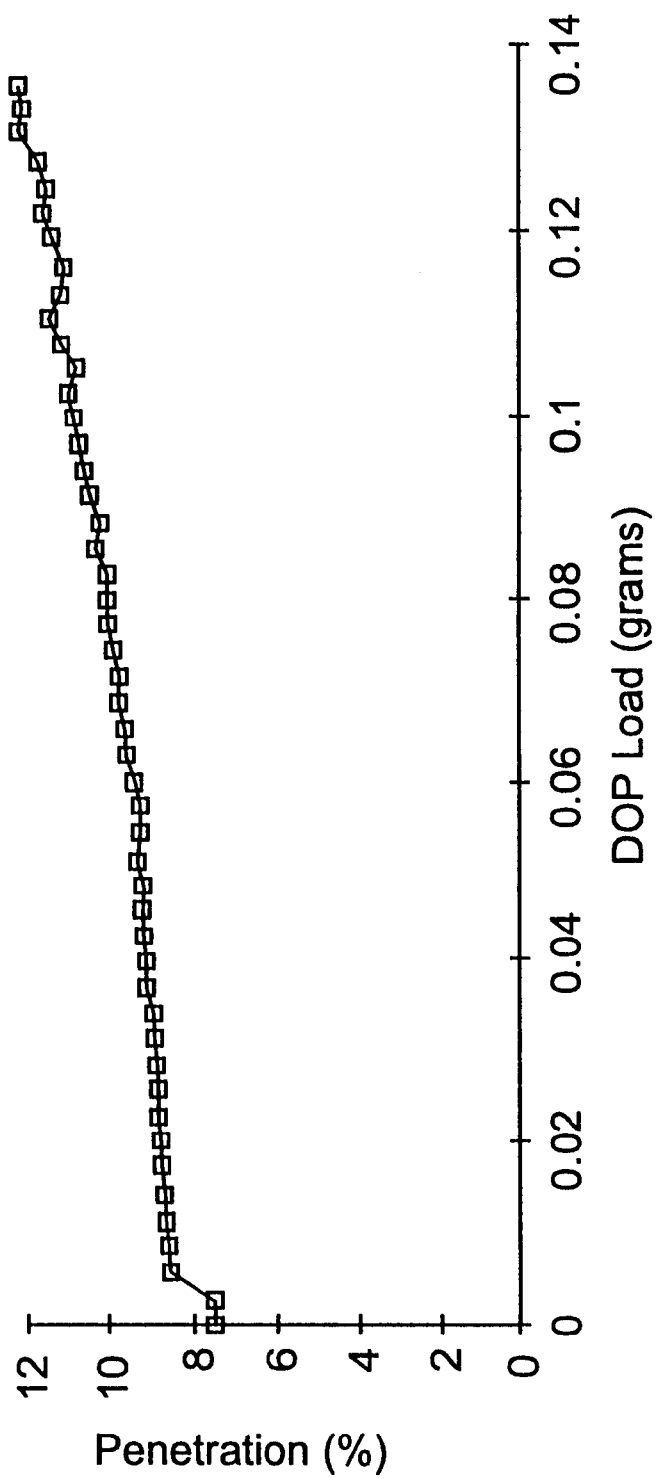
FIG. 3 is a plot of % DOP Penetration vs. DOP Load for Example 40.

The sample was then charged using a DC corona discharge as described above in Example 12, and subjected to the above-described DOP Loading Test. The resulting data are plotted as % DOP Penetration versus DOP Load (grams) in FIG. 3.

Example 41

A polypropylene blown microfiber web, having a basis weight of 20 g/m² and a web width of 15 cm, was vacuum glow-discharge treated in a $C_5F_{12}$ environment. The glow-discharge treatment was performed in a vacuum chamber. The vacuum chamber contained a roll-to-roll glow discharge system consisting of an unwind roller, glow discharge electrodes, and a windup roller for the continuous treatment of the blown microfiber web. Two stainless steel electrodes were in the parallel plate configuration, each electrode was 20 cm wide and 33 cm long and they were separated by a gap of 2.5 cm. The top electrode was grounded and the bottom electrode was powered by a 13.56 MHz rf generator (Plasma-Therm). The web traveled between the two electrodes and in contact with the top, grounded electrode so that one side of the web was exposed to the discharge.

After loading the roll of blown microfiber web onto the unwind roller under $C_5F_{12}$ vapor at a pressure of 0.1 Torr. The blown microfiber web was advanced through the electrodes at a speed of 17 cm/min to achieve an exposure time to the plasma of 2 minutes. The discharge power was 50 W. After the first side was treated, the chamber was vented and the web roll replaced onto the unwind roller to allow the other side of the web to be treated. The treatment of the second side of the web occurred under the same conditions as the first side. After the fluorination, Example 41 was DC-corona charged following the process described above in Example 12.

% DOP Penetration ("%DOP PEN") for Example 41 was determined according to the above-described Initial DOP Penetration and Pressure Drop Test Procedure. The results are summarized in Table III.

TABLE III

| Loading Time (min) | % DOP Penetration Example 14 |
|---|---|
| 0.5 | 28 |
| 10 | 28 |

Other embodiments are within the following claims. Although the electret has been described reference to nonwoven polymeric fibrous webs, the electret can be a variety of polymeric articles including, e.g., those polymeric articles described in U.S. patent application Ser. No. 09/106,506 entitled, "Structured Surface Filter Media, " (Insley et al.), filed on Jun. 18, 1998.

All of the patents and patent applications cited above are incorporated by reference into this document in total.

What is claimed is:

1. A method of making an electret comprising:
   fluorinating a polymeric nonwoven web to produce an article having surface fluorination; and
   charging the fluorinated web in a manner sufficient to produce an electret,
   the electret comprising at least about 45 atomic % fluorine as detected by ESCA.

2. The method of claim 1, comprising charging the fluorinated article by contacting the fluorinated article with water in a manner sufficient to produce an electret, and drying the article.

3. The method of claim 1, comprising charging the fluorinated article by impinging jets of water or a stream of water droplets onto the fluorinated article at a pressure and for a period sufficient to produce an electret, and drying the article.

4. The method of claim 1, comprising fluorinating the polymeric nonwoven web in the presence of an electrical discharge to produce a fluorinated article.

5. The method of claim 4, comprising fluorinating the polymeric nonwoven web in the presence of an alternating current corona discharge at atmospheric pressure.

6. The method of claim 4, comprising fluorinating the polymeric nonwoven web in an atmosphere comprising fluorine containing species selected from the group consisting of elemental fluorine, fluorocarbons, hydrofluorocarbons, fluorinated sulfur, fluorinated nitrogen or a combination thereof.

7. The method of claim 6, wherein the fluorine containing species are selected from the group consisting of $C_5F_{12}$, $C_2F_6$, $CF_4$, hexafluoropropylene, $SF_6$, $NF_3$, or a combination thereof.

8. The method of claim 1, comprising fluorinating the polymeric nonwoven web in an atmosphere comprising elemental fluorine.

9. The method of claim 1, wherein the electret comprises a $CF_3:CF_2$ ratio of at least about 0.25 as determined according to the Method for Determining $CF_3:CF_2$.

10. The method of claim 1, wherein the electret comprises a $CF_3:CF_2$ ratio of at least about 0.45 as determined according to the Method for Determining $CF_3:CF_2$.

11. The method of claim 1, wherein the electret has a Quality Factor of at least about $0.25/mmH_2O$.

12. The method of claim 1, comprising charging the fluorinated article with a direct current corona discharge to produce an electret.

13. The method of claim 1, further comprising annealing the fluorinated article prior to charging the fluorinated article.

14. The method of claim 1, wherein the electret comprises at least about 50 atomic % fluorine as detected by ESCA.

15. The method of claim 1, wherein the charged nonwoven web has surface fluorination that comprises $CF_3$ and $CF_2$ at a $CF_3:CF_2$ ratio of at least 0.45 as determined according to the method for determining $CF_3:CF_2$.

16. The method of claim 1, wherein the charged nonwoven web has surface fluorination that comprises $CF_3$ and $CF_2$ at a $CF_3:CF_2$ ratio of greater than 0.9 as determined according to the method for determining $CF_3:CF_2$.

17. A method of making an electret comprising:
   a) fluorinating a nonwoven polymeric fibrous web
      i) in an atmosphere comprising fluorine containing species and an inert gas, and
      ii) in the presence of an electrical discharge to produce a web having surface fluorination; and
   b) charging the fluorinated web in a manner sufficient to produce an electret,
   the electret comprising at least about 45 atomic % fluorine as detected by ESCA.

18. A method of making an electret article, which method comprises the steps of:

(a) providing a nonwoven fibrous web, wherein the fibers comprise a polymeric nonconductive thermoplastic resin;

(b) placing fluorine atoms on the surface of the polymeric fibers by transferring a fluorine-containing species from a gaseous phase to the fibers; and (c) charging the fluorinated nonwoven fibrous web, the charged nonwoven web comprising at least about 45 atomic % fluorine as detected by ESCA.

19. The method of claim 18, wherein the fibers are fluorinated in the presence of a surface modifying electrical discharge.

20. The method of claim 19, wherein the gaseous phase includes an inert gas, the fluorine-containing species being present in the inert gas.

21. The method of claim 20, wherein the fluorination step is performed at atmospheric pressure.

22. The method of claim 20, wherein the fluorination step is performed at reduced pressure.

23. The method of claim 18, wherein the fluorination step is performed in a controlled atmosphere that prevents contaminants from interfering with the addition of fluorine atoms to the surface of the polymeric fibers.

24. The method of claim 23, wherein the controlled atmosphere is substantially free of oxygen and other contaminants.

25. The method of claim 24, wherein the controlled atmosphere contains less than 0.1 percent oxygen.

26. The method of claim 18, wherein the fluorine-containing species includes one or more of the following: fluorine atoms, elemental fluorine, fluorocarbons, hydrofluorocarbons, fluorinated sulfur, fluorinated nitrogen, $CF_3OCF_3$, and combinations thereof.

27. The method of claim 26, wherein the inert gas is helium, argon, nitrogen, or a combination thereof.

28. The method of claim 19, wherein the surface modifying electrical discharge comprises the use of plasma.

29. The method of claim 18, wherein the fluorination step includes bubbling elemental fluorine gas through a liquid.

30. The method of claim 18, wherein the charging step includes hydrocharging, DC corona discharge, or a combination thereof.

31. The method of claim 30, wherein the charging step includes hydrocharging.

32. The method of claim 31, wherein the charging step includes DC corona discharge.

33. The method of claim 18, wherein the fibers are microfibers.

34. The method of claim 33, wherein the fibers are melt-blown microfibers that have an effective fiber diameter of 1 to 50 micrometers.

35. The method of claim 34, wherein the melt melt-blown microfibers comprise polypropylene resin and have a resistivity of greater than $10^{14}$ ohm*cm.

36. The method of claim 35, wherein the nonwoven web has a basis weight of 10 to 100 g/m$^2$ and has a thickness of 0.25 to 20 mm.

37. The method of claim 18, wherein the charged nonwoven web has a surface fluorination that comprises $CF_3$ and $CF_2$ at a $CF_3$:$CF_2$ ratio of at least 0.45 as determined according to the method for determining $CF_3$:$CF_2$.

38. The method of claim 37, wherein the nonwoven web comprises polymeric microfibers.

39. The method of claim 38, wherein the charged nonwoven web exhibits a Quality Factor of at least about 1.0 per mm $H_2O$.

40. The method of claim 37, wherein the charged nonwoven web has a $CF_3$:$CF_2$ ratio of at least 0.9.

41. The method of claim 38, wherein the microfibers are melt-blown microfibers that have an effective fiber diameter of 1 to 50 $\mu$m.

42. The method of claim 41, wherein the microfibers are made from a resin that has a resistivity greater than $10^{14}$ ohm-cm.

43. The method of claim 42, wherein the microfibers comprise a thermoplastic polyolefin.

44. The method of claim 43, wherein the microfibers comprise polypropylene.

45. The method of claim 44, wherein the nonwoven web has a basis weight of 10 to 100 g/m$^2$.

46. The method of claim 45, wherein the nonwoven web has a thickness of 0.25 to 20 mm.

47. The method of claim 46, wherein the nonwoven web has been fluorinated by transferring a fluorine containing species from a gaseous phase to the nonwoven web.

48. A method of making an electret comprising:

fluorinating a polymeric article to produce an article having surface fluorination;

annealing the fluorinated article; and charging the fluorinated article in a manner sufficient to produce an electret.

49. A method of making an electret comprising:

fluorinating a polymeric article in the presence of an alternating current corona discharge at atmospheric pressure to produce an article having surface fluorination; and charging the fluorinated article in a manner sufficient to produce an electret.

50. A method of making an electret comprising:

fluorinating a polymeric article at atmospheric pressure to produce an article having surface fluorination; and charging the fluorinated article in a manner sufficient to produce an electret.

51. A method of making an electret comprising:

fluorinating a polymeric article to produce an article having surface fluorination; and charging the fluorinated article in a manner sufficient to produce an electret, the electret having a quality factor of at least 1.0/mmH$_2$O.

52. The method of claim 51, wherein the electret has a Quality Factor of at least 1.5/mmH$_2$O.

53. The method of claim 51, wherein the electret has a Quality Factor of at least 2/mmH$_2$O.

54. The method of claim 51, wherein the electret has a Quality Factor of at least 3/mmH$_2$O.

55. The method of claim 51, wherein the electret has a Quality Factor of at least 5/mmH$_2$O.

56. A method of making an electret article, which method comprises the steps of:

(a) providing a nonwoven fibrous web, wherein the fibers comprise a polymeric nonconductive thermoplastic resin;

(b) placing fluorine atoms on the surface of the polymeric fibers by transferring a fluorine-containing species from a gaseous phase to the fibers; and (c) charging the fluorinated nonwoven fibrous web, the charged nonwoven web having a surface fluorination that comprises $CF_3$ and $CF_2$ at a $CF_3$:$CF_2$ ratio of at least 0.45 as determined according to the method for determining $CF_3$:$CF_2$.

57. A method of making an electret article, which method comprises the steps of:
 (a) providing a nonwoven fibrous web, wherein the fibers comprise a polymeric nonconductive thermoplastic resin;
 (b) placing fluorine atoms on the surface of the polymeric fibers by transferring a fluorine-containing species from a gaseous phase to the fibers; and
 (c) charging the fluorinated nonwoven fibrous web,
the charged nonwoven web exhibiting a Quality Factor of at least about $1.0/mmH_2O$.

58. A method of making an electret article, which method comprises the steps of:
 (a) providing a nonwoven fibrous web, wherein the fibers comprise a polymeric nonconductive thermoplastic resin;
 (b) bubbling elemental fluorine gas through a liquid;
 (c) placing fluorine atoms on the surface of the polymeric fibers by transferring a fluorine-containing species from a gaseous phase to the fibers; and
 (d) charging the fluorinated nonwoven fibrous web.

* * * * *

UNITED STATES PATENT AND TRADEMARK OFFICE
CERTIFICATE OF CORRECTION

PATENT NO. : 6,397,458 B1
DATED : June 4, 2002
INVENTOR(S) : Jones, Marvin E.

It is certified that error appears in the above-identified patent and that said Letters Patent is hereby corrected as shown below:

Column 3,
Line 64, "0.5/mmH2O" should read as -- $0.5/mmH_2O$ --.

Column 4,
Line 49, both occurrences of "$gm^2$" should read as -- $g/m^2$ --.

Column 9,
Line 18, "about:200" should read as -- about 200 --.
Lines 21 and 45, "$gm^2$" should read as -- $g/m^2$ --.

Column 10,
Line 60, after "in." insert -- by 7in. --.

Signed and Sealed this

Third Day of December, 2002

JAMES E. ROGAN
*Director of the United States Patent and Trademark Office*

UNITED STATES PATENT AND TRADEMARK OFFICE
CERTIFICATE OF CORRECTION

PATENT NO. : 6,397,458 B1
DATED : June 4, 2002
INVENTOR(S) : Jones et al.

It is certified that error appears in the above-identified patent and that said Letters Patent is hereby corrected as shown below:

Column 6,
Line 29, "save" should read -- shape --.

Column 13,
Line 23, between "of" and "fluorine" insert -- the --.
Line 46, "31" should read -- 18 --.
Line 55, "ohm*cm." should read -- ohm·cm. --.

Signed and Sealed this

Twentieth Day of December, 2005

JON W. DUDAS
*Director of the United States Patent and Trademark Office*